United States Patent
Arora

(10) Patent No.: US 10,679,152 B2
(45) Date of Patent: Jun. 9, 2020

(54) METHOD AND SYSTEM FOR TRAVEL ITINERARY BIDDING VIA BLOCKCHAIN

(71) Applicant: Mastercard International Incorporated, Purchase, NY (US)

(72) Inventor: Ankur Arora, New Delhi (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 415 days.

(21) Appl. No.: 15/370,657

(22) Filed: Dec. 6, 2016

(65) Prior Publication Data

US 2018/0157999 A1 Jun. 7, 2018

(51) Int. Cl.
| | |
|---|---|
| *G06Q 10/02* | (2012.01) |
| *G06Q 30/08* | (2012.01) |
| *G06Q 30/06* | (2012.01) |
| *G06Q 50/14* | (2012.01) |

(52) U.S. Cl.
CPC .......... *G06Q 10/02* (2013.01); *G06Q 10/025* (2013.01); *G06Q 30/0611* (2013.01); *G06Q 30/08* (2013.01); *G06Q 50/14* (2013.01)

(58) Field of Classification Search
None
See application file for complete search history.

(56) References Cited

U.S. PATENT DOCUMENTS

2003/0233311 A1* 12/2003 Bramnick .......... G06Q 30/0601
705/37
2011/0307344 A1* 12/2011 Slater ................. G06Q 30/08
705/26.3
2013/0211863 A1 8/2013 White
(Continued)

FOREIGN PATENT DOCUMENTS

EP 3193299 A1 7/2017
WO 2015/183901 A2 12/2015

OTHER PUBLICATIONS

Notification of Transmittal of the International Search Report and the Written Opinion of the International Searching Authority (Forms PCT/ISA/220, PCT/ISA/210, and PCT/ISA/237) dated Jan. 2, 2018, in the corresponding International Application No. PCT/US2017/058428. (12 pages).

*Primary Examiner* — Paul Danneman
(74) *Attorney, Agent, or Firm* — Buchanan Ingersoll & Rooney PC

(57) ABSTRACT

A method for processing travel bids via blockchain includes: receiving an itinerary request including a travel itinerary comprised of reservation requests, each reservation request including a type identifier and reservation details; transmitting a blockchain transaction to a blockchain network for each reservation requests, the transaction including the reservation details and a unique identifier; receiving merchant bid for each reservation request, wherein each merchant bid includes a bid amount and additional bidding details; identifying a winning bid for each reservation request based on the bid amount and additional bidding details included in each corresponding merchant bid; and transmitting a new blockchain transaction to the blockchain network for each reservation request, wherein the blockchain transaction includes the unique identifier and indicates unavailability of the corresponding reservation request.

16 Claims, 5 Drawing Sheets

(56) References Cited

U.S. PATENT DOCUMENTS

2015/0278820 A1* 10/2015 Meadows ........ G06Q 20/40145
                                                    705/64
2016/0098723 A1   4/2016 Feeney
2016/0261690 A1   9/2016 Ford
2017/0221029 A1*  8/2017 Lund ....................... G06F 21/00

* cited by examiner

US 10,679,152 B2

METHOD AND SYSTEM FOR TRAVEL ITINERARY BIDDING VIA BLOCKCHAIN

FIELD

The present disclosure relates to bidding on travel itinerary items, specifically where travel itinerary items are made publicly accessible to relevant merchants via a blockchain for transparency and immutability of itinerary information, with bidding being performed to ensure the best possible outcomes for travelers.

BACKGROUND

Millions of people travel every single day; some travel for business, some for pleasure, and some because they have a need to get from one place to another. Business travelers often travel with very short notice, where plane tickets, hotel reservations, and other pieces of their itinerary are commonly purchased very quickly and through an agent or specialized system. As a result, business travelers do not often have the opportunity to shop around for better deals, and are sometimes not even aware of different options when it comes to their travels. Other travelers, on the other hand, often do make an attempt to shop around for less expensive options when it comes to their travel itinerary. However, with the myriad of merchants and vendors and other travel providers that exist, it may be difficult or impossible for a traveler to even be aware of each potential vendor for an aspect of their trip, let alone to price using each vendor.

In an effort to assist travelers, some systems have been developed that operate as aggregators for travel booking. Such systems often operate by having a potential traveler provide itinerary information, and then by searching for price estimates and other information across a plurality of other booking systems. As such, a potential traveler can use one application program or website rather than several, to get the information that would have been obtained by using each program or website individually. However, to use such systems the potential traveler must first be aware of such a system. In addition, such systems can only provide from services that allow such information to be aggregated. As a result, potential travelers may continue to be limited in terms of achieving the best possible deal by pricing a plurality of different providers.

Furthermore, existing systems can also hamper the ability for travel providers to earn travelers' business. For instance, a potential traveler may attempt to book a hotel through a few aggregating services or travel providers. Each of the travel providers may not be aware of the potential traveler's attempts to book through other services, and may not appreciate the urgency of the traveler's booking and may thus not be able to take advantage by offering the potential traveler special deals or discounts. In addition, some travel providers, including those that may have the best offers for the potential traveler, may not even be consulted by the potential traveler and may themselves not be aware of the potential traveler, and thus miss out on potential revenue they may have earned if provided the opportunity to earn the traveler's business.

Thus, there is a need for a technological solution to enable travel itinerary information submitted by an individual for desired travel to be made publicly available to travel providers, and that may provide the travel providers with an opportunity to earn the business of the individual with respect to the travel itinerary.

SUMMARY

The present disclosure provides a description of systems and methods for processing travel bids via blockchain. The use of a blockchain can ensure that a traveler's desired travel itinerary is publicly accessible to each merchant that is capable of bidding on the itinerary. This enables all travel providers to have an equal opportunity to earn the business of a traveler, without requiring the traveler to seek out every potential travel provider, and without the travel provider having to expend significant resources on marketing and outreach. The use of bidding can enable travel providers to make adjustments as necessary to earn business as they desire, which can also enable a traveler to receive the best possible deal with respect to each item in their travel itinerary. As a result, travelers save both time and money with respect to their travel itinerary, and travel providers are provided with greater opportunities to earn and increase revenue.

A method for processing travel bids via blockchain includes: receiving, by a receiving device of a processing server, an itinerary request, wherein the itinerary request includes at least a travel itinerary comprised of one or more reservation requests, each reservation request including at least a type identifier and reservation details; electronically transmitting, by a transmitting device of the processing server, a blockchain transaction to a node of a blockchain network for each of the one or more reservation requests, wherein the blockchain transaction includes at least the included reservation details and a unique identifier; receiving, by the receiving device of the processing server, at least one merchant bid for each of the one or more reservation requests, wherein each merchant bid includes at least a bid amount and additional bidding details; identifying, by a determination module of the processing server, a winning bid for each of the one or more reservation requests, wherein the winning bid is one of the at least one merchant bids received for the respective reservation request and is based on at least the bid amount and additional bidding details included in each of the at least one merchant bids; and electronically transmitting, by the transmitting device of the processing server, a new blockchain transaction to a node of the blockchain network for each of the one or more reservation requests, wherein the blockchain transaction includes at least the unique identifier and indicates unavailability of the corresponding reservation request.

A system for processing travel bids via blockchain includes: a determination module of a processing server; a receiving device of the processing server configured to receive an itinerary request, wherein the itinerary request includes at least a travel itinerary comprised of one or more reservation requests, each reservation request including at least a type identifier and reservation details; and a transmitting device of the processing server configured to electronically transmit a blockchain transaction to a node of a blockchain network for each of the one or more reservation requests, wherein the blockchain transaction includes at least the included reservation details and a unique identifier, wherein the receiving device of the processing server is further configured to receive at least one merchant bid for each of the one or more reservation requests, wherein each merchant bid includes at least a bid amount and additional bidding details, the determination module of the processing server is configured to identify a winning bid for each of the one or more reservation requests, wherein the winning bid is one of the at least one merchant bids received for the respective reservation request and is based on at least the bid amount and additional bidding details included in each of the at least one merchant bids, and the transmitting device of the processing server is further configured to electronically transmit a new blockchain transaction to a node of the blockchain network for each of the one or more reservation requests, wherein the blockchain transaction includes at least the unique identifier and indicates unavailability of the corresponding reservation request.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
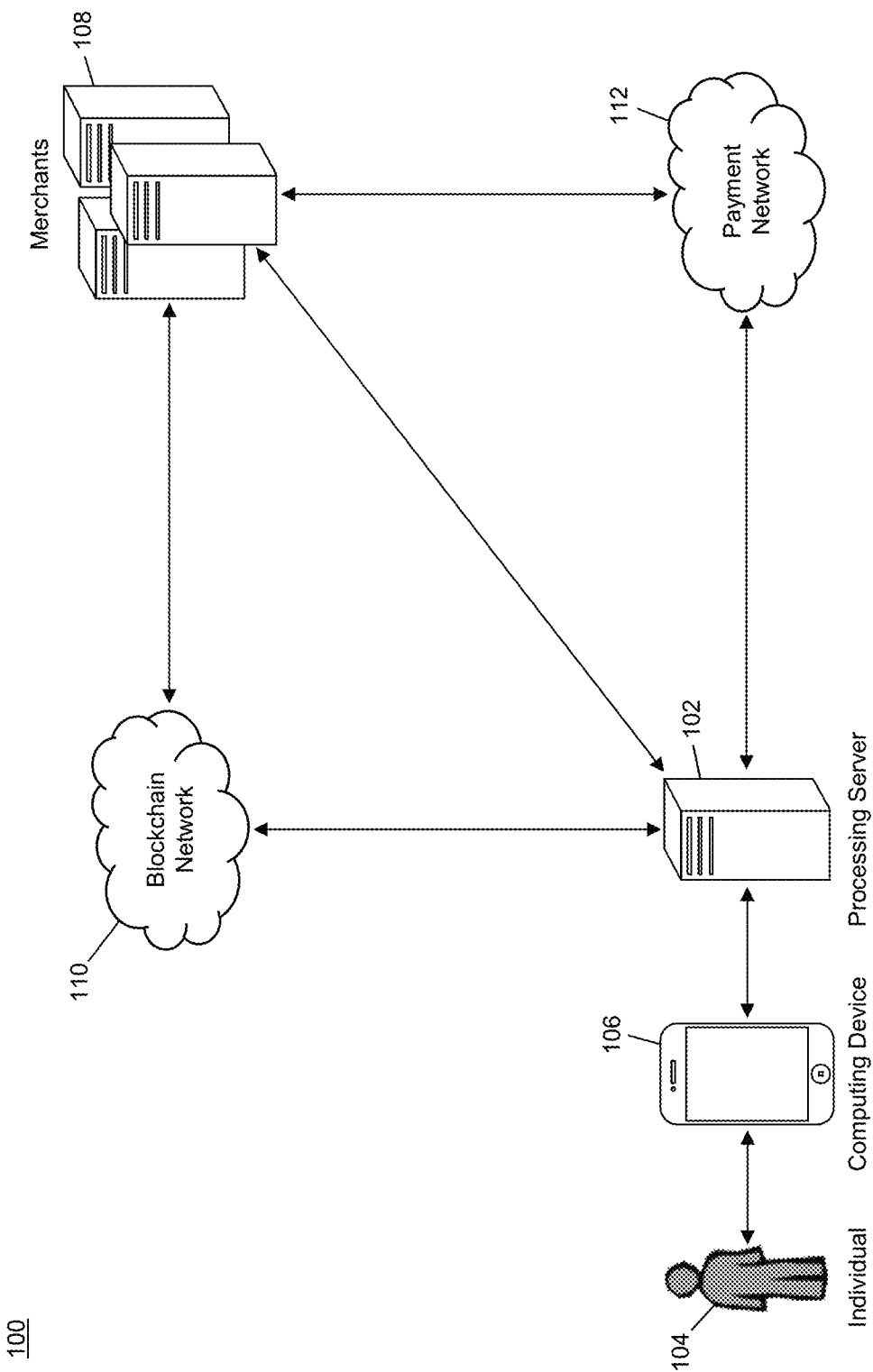
FIG. 1 is a block diagram illustrating a high level system architecture for the processing of travel bids for a travel itinerary posted via a blockchain in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for the Processing of Travel Bids Using a Blockchain

FIG. 1 illustrates a system 100 for the processing of travel bids for a travel itinerary, where the travel itinerary is made publicly accessible to eligible travel providers via a blockchain.

The system 100 may include a processing server 102. The processing server 102, discussed in more detail below, may be configured to process travel bids for a travel itinerary on behalf of an individual 104 that desires travel. The processing server 102 may be a specially configured computing device that is specifically configured for performing the functions discussed herein. In the system 100, the individual 104 may utilize a computing device 106 to communicate with the processing server 102, where the computing device 106 may be any type of computing device suitable for performing the functions discussed herein, such as a desktop computer, notebook computer, laptop computer, tablet computer, cellular phone, smart phone, smart watch, smart television, wearable computing device, implantable computing device, etc.

The computing device 106 and processing server 102 may communicate using any suitable communication network and method, such as via a local area network, cellular communication network, the Internet, etc., or a combination thereof. The computing device 106 may be configured to provide an interface to the individual 104 for providing information to the processing server 102 to perform the functions discussed herein. The interface may be any suitable type of interface, such as an application programming interface, an application program executed by the computing device 106, a web page, etc.

The individual 104 may submit a desired travel itinerary to the processing server 102 via the computing device 106 as part of a travel itinerary request. The travel itinerary request may request fulfillment of the desired travel itinerary, where the travel itinerary may be comprised of one or more reservation requests. Each reservation request may be a request for a specific item in the travel itinerary related to the travel desired by the individual 104. For instance, a travel itinerary may be comprised of a reservation request for a hotel room for a specific number of nights, round-trip airfare between specific airports on specific days, a rental car in a specific location for specific days, and a tour service on a specific day in the specific location. For example, an individual 104 traveling to Alexandria, Va. may submit a travel itinerary to the processing server 102 (e.g., via the computing device 106) that requests round-trip airfare between their home airport and one of the three major airports in the Alexandria area on specific days, a rental car for pick up and drop off one of the major airports for the specific days, and a hotel in Alexandria for each of the nights. Each reservation request may include reservation details associated with the desired itinerary item and a type identifier associated therewith. For instance, the reservation request for round-trip airfare may have a type identifier indicating the request is for airfare, where the reservation details may include the need for round-trip, the departure and arrival airports, the departure and return dates, the number of travelers, and any other information that may be needed by the corresponding travel provider to make a bid on the itinerary item (e.g., seat class, dietary restrictions, desired stops, etc.).

In some embodiments, the individual 104 may submit the travel itinerary comprised of separated reservation requests to the processing server 102, where the individual 104 may select the values for each reservation request prior to submission. In other embodiments, the travel itinerary may be submitted to the processing server 102 for parsing thereof into the corresponding reservation requests. For instance, the individual 104 may submit a travel itinerary for travel from one location to another between two days and request air transportation, hotel, and a vehicle, where the processing server 102 may parse out the individual reservation requests for the air travel, hotel, and rental car (e.g., by identifying the locations, dates, and other criteria required for the corresponding reservation). In the above example, the individual 104 may submit the itinerary to travel from their home to Alexandria, Va. on the specific days and request air transportation, hotel, and car, where the processing server 102 may parse the itinerary into the three reservation requests, identifying the airports and dates for the air transportation, locations and dates for the hotel, and location and dates for the rental car.

The processing server 102 may submit the reservation requests in the individual's submitted travel itinerary to a blockchain for posting. The processing server 102 may electronically transmit the reservation requests as transaction values to a node in a blockchain network 110. The blockchain network 110 may be comprised of a plurality of nodes configured to generate and validate new blocks for adding to a blockchain associated with the blockchain network 110. The blockchain may be comprised of a plurality of blocks. Each block may be comprised of a block header and a plurality of transaction values. The block header in a block may be comprised of at least a reference to a previous block, a timestamp when the respective block was generated, and a reference to the plurality of transaction values included in the respective block. In an exemplary embodiment, the references included in a blockchain may be hash values generated via the application of one or more hashing algorithms to the associated data. For instance, the reference to the previous block may be a hash value generated via the application of a hashing algorithm to the block header of an earlier block in the blockchain. The use of references may ensure the immutability of the blockchain, as a change to any transaction value in the blockchain would yield a different reference value, requiring the corresponding block header to be changed, which in turn would yield a different reference value for that block header, requiring every single corresponding block to be changed. As such, every block in the blockchain may be verifiable by the calculation of the reference values using the appropriate hashing algorithms.

The reservation requests may be added to a new block that is added to the blockchain as transaction values included therein. In an exemplary embodiment, each reservation request may be assigned a unique identifier. In some instances, the unique identifier may be assigned by the node in the blockchain network 110 and communicated to the processing server 102. In other instances, the processing server 102 may assign unique identifiers to each reservation request. Once the new block is added to the blockchain, a plurality of merchants 108 may receive the new block. If desired, each merchant 108 may be capable of verifying that the new block is genuine by generating the references using the appropriate hashing algorithm(s) and checking them against the references stored in the blocks in the blockchain.

A merchant 108 desiring to make a bid may identify the reservation requests included in the new block and identify each reservation request having a type identifier that corresponds to the services provided by the merchant 108. For instance, an airline may look for any reservation request where the type identifier indicates that the request is for airfare. In some embodiments, the processing server 102 may notify merchants 108 when a relevant reservation request is submitted to the blockchain. For instance, the processing server 102 may electronically transmit a notification to each merchant 108 associated with a type identifier corresponding to posted reservation request, where the notification includes the unique identifier assigned to the reservation request, to inform the merchant 108 that there is a new itinerary item available to bid on. In some cases, the individual 104 may provide (e.g., in the travel itinerary) a list of merchants 108 whom the individual 104 would like to bid on their desired travel.

Once the merchant 108 has identified relevant reservation requests, the merchant 108 may generate a merchant bid for the reservation request based on the reservation details included therein. The merchant bid may include at least the unique identifier assigned to the reservation request (e.g., for identification of the reservation request to which a bid corresponds), a bid amount (e.g., the cost to be paid by the individual 104 for fulfillment of the itinerary item), and additional bidding details that are relevant for the corresponding bid. For instance, a bid for airfare may include the flight times, stops, flight numbers, seat classes, layover times, etc., while a bid for a hotel may include the hotel location, room type, check-in and check-out times, hotel amenities, etc. The merchant 108 may electronically transmit their merchant bid to the processing server 102 using a suitable communication network and method.

The processing server 102 may thus receive a plurality of merchant bids from a plurality of different merchants 108 for each reservation request included in the individual's submitted travel itinerary. The processing server 102 may then identify, for each reservation request, a winning bid. The winning bid may be selected based on predefined criteria and/or criteria submitted by the individual 104, such as in the original travel itinerary request. For instance, the processing server 102 may, by default, identify the lowest cost bid (e.g., based on bid amount) as the winning bid for a reservation request, where such predefined criteria may be overridden by criteria selected by the individual 104. For example, the individual 104 may request a hotel closest to a specific geographic location, or may request that hotels be weighted based on geographic location, such that the winning bid is selected based on a combination of its location and bid amount (e.g., the individual 104 may want a hotel closest to a desired location, but may be fine taking a hotel further away if it is less expensive by a specific amount). The processing server 102 may, using the predefined and/or submitted criteria, identify a winning bid for each of the reservation requests.

Once a winning bid has been identified, the processing server 102 may notify each of the relevant parties. The processing server 102 may notify the individual 104 of the winning bids for each of their reservation requests, which may comprise their completed travel itinerary. The processing server 102 may also notify each of the merchants 108 associated with the winning bids that their bids won, so that each merchant 108 may proceed with reserving the corresponding travel item. As part of the notification process, the processing server 102 may also be configured to update the blockchain accordingly. For instance, the processing server 102 may submit new transaction values to a node of the blockchain network 110 that includes the unique identifier for each reservation request that also indicates that the corresponding itinerary item has been fulfilled. The transaction values may be posted to the blockchain, such that any merchant 108 that reviews a reservation request may be able to identify the unique identifier in any newer blocks and see that a reservation request is no longer valid, if it has already been fulfilled. As a result, merchants 108 may always be apprised of any outstanding or fulfilled reservation requests by review of the blockchain, which indicates the time at which data was added and is immutable.

Following notification of the winning bids, the merchants 108 and individual 104 may proceed to engage in a payment transaction for the purchase of the itinerary item. In some embodiments, the processing server 102 may be configured to assist in the transaction process. In such embodiments, the individual 104 may submit payment credentials to the processing server 102 that correspond to a transaction account to be used in paying for the travel itinerary items. The processing server 102 may use the payment credentials to fund payment transactions for each of the travel itinerary items, to secure the travel on behalf of the individual 104. In some cases, the processing server 102 may be configured to initiate electronic payment transactions for each travel itinerary item itself, such as by conveying the payment credentials and other transaction information (e.g., the bid amount, merchant data, etc.) to a payment network 112 for processing. In other cases, the processing server 102 may electronically transmit the payment credentials to each winning merchant 108 for submission to the payment network 112 using traditional methods and systems. The payment network 112 may be configured to process each electronic payment transaction using traditional methods and systems, which may secure the individual's travel itinerary.

In some embodiments, the processing server 102 may be configured to enable merchants 108 to bid on multiple reservation requests at once. For instance, a merchant 108 (e.g., or two merchants 108 working together) may have a special deal to provide for fulfilling two reservation requests at once (e.g., a combined deal for hotel and airfare). In such instances, the merchant 108 or merchants 108 may submit a merchant bid that includes the unique identifier for both reservation requests and the corresponding bid amount and bidding information. The processing server 102 may consider the combined merchant bid against the merchant bids for both reservation requests, such as by checking to see if any combination of bids for the hotel and airfare has a smaller bid amount that then combined bid (e.g., also taking into account any other criteria submitted by the individual 104). In such embodiments, the individual 104 may be provided with the best suitable bids, regardless of how the travel itinerary may be booked. In some cases, the individual 104 may indicate in their travel itinerary request if they are willing to accept combined bids. For example, an individual 104 may not want combined bids due to restrictions associated therewith.

The methods and systems discussed herein enable individuals 104 to have their travel itinerary fulfilled by a plurality of merchants 108 without the individual 104 having to reach out to the individual merchants 108. Merchants 108 are also able to identify reservation requests for bidding without having to communicate directly with individuals 104. The use of a blockchain ensures that the itinerary information is publicly accessible for merchants 108, ensuring wider availability of itinerary items for merchants 108 and a wider merchant pool for bidding for individuals 104. In addition, the immutability of the blockchain can ensure that an individual's desired travel plans are not misinterpreted or unfairly adjusted by merchants 108, as there is immutable proof of their desired travel itinerary. As a result, the methods and systems discussed herein also provide individuals 104 with greater security with respect to their travel plans, thus increasing transparency and accountability in the reservation process.

Processing Server

Figure 2:
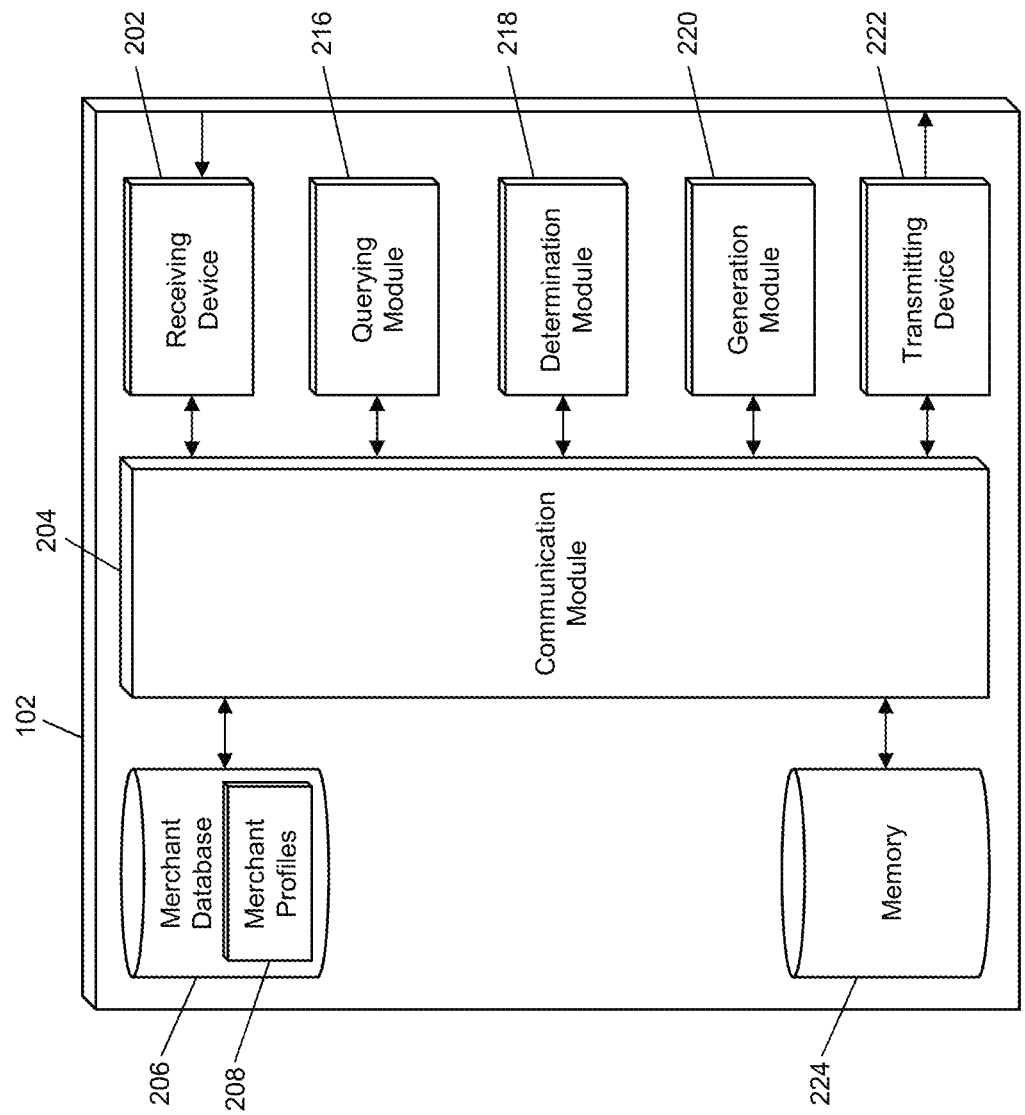
FIG. 2 is a block diagram illustrating the processing server of the system of FIG. 1 for the processing of travel bids in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from computing devices 106, merchants 108, blockchain networks 110, and other systems and entities via one or more communication methods, such as Bluetooth, local area networks, cellular communication networks, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by computing devices 106, which may be superimposed or otherwise encoded with travel itinerary requests, where a travel itinerary request is comprised of one or more reservation requests that are part of a desired travel itinerary. In some instances, a travel itinerary request may also include selection criteria for the selection of winning bids, payment credentials for purchasing travel reservations, and other suitable data. The receiving device 202 may also be configured to receive data signals electronically transmitted by merchants 108, which may be superimposed or otherwise encoded with merchant bids, where each merchant bid may include at least a unique identifier, bid amount, and bidding information. In some cases, the receiving device 202 may be configured to receive data signals electronically transmitted by nodes in a blockchain network 110, which may be superimposed or otherwise encoded with blocks including transaction values, such as for verification by the processing server 102.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 216, determination module 218, generation module 220, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include a merchant database 206. The merchant database 206 may be configured to store a plurality of merchant profiles 208 using a suitable data storage format and schema. The merchant database 206 may be a relational database that utilizes structured query language for the storage, identification, modifying, updating, accessing, etc. of structured data sets stored therein. Each merchant profile 208 may be a structured data set configured to store data related to a merchant 108 that may be eligible for bidding on reservation requests. A merchant profile 208 may include at least a type identifier associated with services provided by the related merchant 108 and communication information used for directing electronic data transmissions to the related merchant 108. In some cases, the merchant profile 208 may include additional data associated with the merchant 108, such as for identifying merchant eligibility with respect to criteria submitted in an itinerary request. For example, a merchant profile 208 for an airline may include airports not serviced by the airline, to prevent the airline from being notified of new reservation requests that request air travel involving an airport they do not service.

The processing server 102 may include a querying module 216. The querying module 216 may be configured to execute queries on databases to identify information. The querying module 216 may receive one or more data values or query strings, and may execute a query string based thereon on an indicated database, such as the merchant database 206, to identify information stored therein. The querying module 216 may then output the identified information to an appropriate engine or module of the processing server 102 as necessary. The querying module 216 may, for example, execute a query on the merchant database 206 to identify merchant profiles 208 that are eligible for bidding on a reservation request based on the type identifier included therein, and any additionally supplied criteria, as applicable.

The processing server 102 may also include a determination module 218. The determination module 218 may be configured to make determinations on data as part of the functions of the processing server 102 as discussed herein. The determination module 218 may receive instructions as input, may perform determinations based on the instructions, and may output a result of the determination to another module or engine of the processing server 102. For example, the determination module 218 may be configured to determine a winning bid among a plurality of merchant bids for a reservation request, where the winning bid may be determined based on at least the corresponding bid amounts, and may also be based on additional bid information in each bid and selection criteria provided in the travel itinerary request.

The processing server 102 may also include a generation module 220. The generation module 220 may be configured to generate data as part of the functions of the processing server 102 as discussed herein. The generation module 220 may receive an instruction as input, may generate data based on the instruction, and may output the generated data to another module or engine of the processing server 102. The generation module 220 may, for example, be configured to generate blockchain transaction values, such as may include a unique identifier and a reservation request. In some cases, the generation module 220 may also be configured to generate unique identifiers for each reservation request for inclusion in the corresponding transaction value. Unique identifiers may be any type of value suitable for use in the identification of a reservation request, such as an identification number. The generation module 220 may also be configured to generate notification messages, such as for transmission to individuals 104 regarding winning bids and to merchants 108 associated with winning bids. In embodiments where the processing server 102 is configured to participate in payment transactions, the generation module 220 may be configured to generate transactions messages for submission to a payment network 112, where a transaction message may be a specially formatted data message formatted pursuant to one or more standards governing the exchange of financial transaction messages used in the processing of electronic payment transactions, such as the International Organization of Standardization's ISO 8583 or 20022 standards.

The processing server 102 may also include a transmitting device 222. The transmitting device 222 may be configured to transmit data over one or more networks via one or more network protocols. In some instances, the transmitting device 222 may be configured to transmit data to computing devices 106, merchants 108, blockchain networks 110, payment networks 112, and other entities via one or more communication methods, such as Bluetooth, radio frequency, local area networks, cellular communication networks, the Internet, etc. In some embodiments, the transmitting device 222 may be comprised of multiple devices, such as different transmitting devices for transmitting data over different networks, such as a first transmitting device for transmitting data over a local area network and a second transmitting device for transmitting data via the Internet. The transmitting device 222 may electronically transmit data signals that have data superimposed that may be parsed by a receiving computing device. In some instances, the transmitting device 222 may include one or more modules for superimposing, encoding, or otherwise formatting data into data signals suitable for transmission.

The transmitting device 222 may be configured to electronically transmit data signals to computing devices 106 that are superimposed or otherwise encoded with notifications regarding winning bids and requested travel itineraries, which may include the bid amounts and bidding information for winning bids and any additional data, such as reservation confirmations in instances where the processing server 102 may initiate payment transactions for purchasing of the requested travel items on behalf of the individual 104. The transmitting device 222 may also be configured to electronically transmit data signals to merchants 108, which may be superimposed or otherwise encoded with bid requests and winning bid notifications. Bid requests may include unique identifiers associated with reservation requests for which the merchant 108 is eligible to bid. Winning bid notifications may include unique identifiers associated with reservation requests that the merchant 108 has won the bid on with their submitted merchant bid. The transmitting device 222 may be configured to electronically transmit data signals to blockchain networks 110, which may be superimposed or otherwise encoded with transaction values for addition to an associated blockchain, which may include unique identifiers and corresponding reservation requests. In some embodiments, the transmitting device 222 may also be configured to electronically transmit data signals to payment networks 112, which may be superimposed or otherwise encoded with transaction messages related to electronic payment transactions for processing for the purchase of travel itinerary items.

The processing server 102 may also include a memory 224. The memory 224 may be configured to store data for use by the processing server 102 in performing the functions discussed herein, such as public and private keys, symmetric keys, etc. The memory 224 may be configured to store data using suitable data formatting methods and schema and may be any suitable type of memory, such as read-only memory, random access memory, etc. The memory 224 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 224 may be comprised of or may otherwise include a relational database that utilizes structured query language for the storage, identification, modifying, updating, accessing, etc. of structured data sets stored therein.

Process for Travel Itinerary Bidding and Booking Using Blockchain

Figure 3:
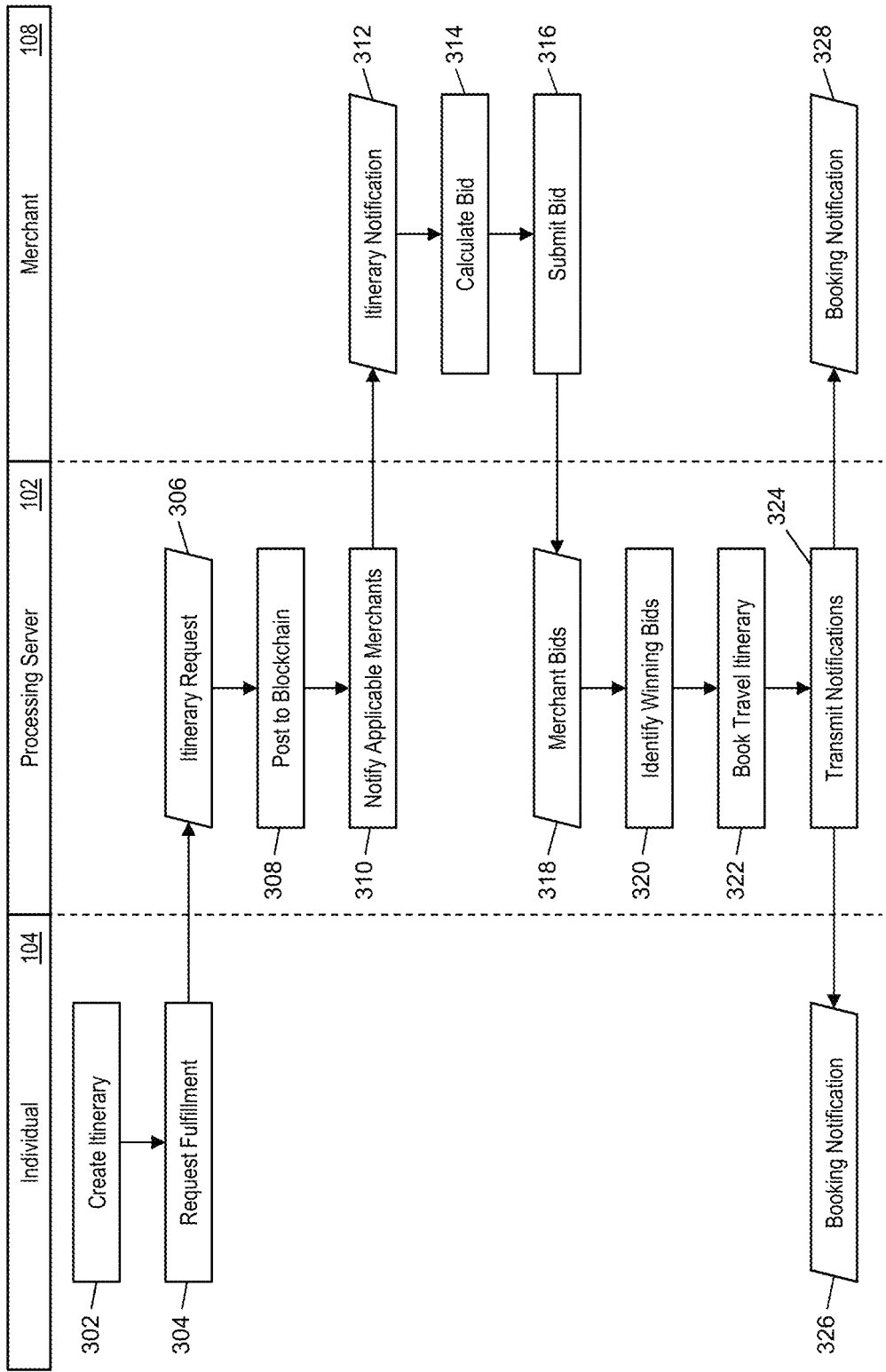
FIG. 3 is a flow diagram illustrating a process for the processing of travel bids for travel itinerary items posted to a blockchain using the system of FIG. 1 in accordance with exemplary embodiments.

FIG. 3 illustrates a process for the processing of travel bids using data posted to a blockchain and the booking thereof to satisfy a desired travel itinerary for the individual 104 in the system 100.

In step 302, the individual 104 may create, using the computing device 106, a customized, personalized travel itinerary that they would like fulfilled. The travel itinerary may be comprised of one or more travel itinerary items for which fulfillment is requested, each item being comprised of at least a type and one or more reservation details. For instance, the individual 104 may create an itinerary consisting of round-trip flights between LaGuardia Airport and Ronald Reagan Airport on January 1st and 6th, and five nights in a hotel in Arlington, Va. In step 304, the individual 104 may, using the computing device 106, submit a travel itinerary request to the processing server 102 using the provided platform. In step 306, the receiving device 202 may receive the travel itinerary request, which may include a reservation request for each of the travel itinerary items, the reservation request including the type identifier and reservation details. For instance, in the above example, the travel itinerary request may include two reservation requests: one for airfare and one for hotel.

In step 308, the transmitting device 222 of the processing server 102 may electronically transmit each reservation request to a node in the blockchain network 110 as a transaction value for inclusion in a block and posting to a corresponding blockchain. In some instances, the generation module 220 of the processing server 102 may first generate a unique identifier for inclusion with each reservation request. In other instances, the blockchain node may generate a unique identifier for each reservation request that is included in the corresponding transaction value and returned to the processing server 102 (e.g., to be received by the receiving device 202). In step 310, the transmitting device 222 of the processing server 102 may electronically transmit a bid request notification to a plurality of different merchants 108 that are associated with type identifiers included in the reservation requests (e.g., using communication information and type identifiers stored in merchant profiles 208 in the merchant database 206, identified via queries executed by the querying module 216 of the processing server 102).

In step 312, each merchant 108 may receive one or more big request notifications from the processing server 102. Each bid request notification may include the unique identifier associated with a reservation request from the requested travel itinerary for which the merchant 108 is eligible to bid. For instance, in the above example, an airline would receive the unique identifier for the reservation request for airfare in the individual's desired trip. In step 314, the merchant 108 may identify the corresponding travel request in the blockchain using the unique identifier and may calculate a bid for the itinerary item based on the reservation details included therein. In step 316, each merchant 108 may submit a merchant bid for each reservation request that they wish to bid on.

In step 318, the receiving device 202 of the processing server 102 may receive the merchant bids from a plurality of merchants 108, where each merchant bid may include at least the unique identifier for the reservation request to which the bid applies, a bid amount, and additional bidding information. In step 320, the determination module 218 of the processing server 102 may determine a winning bid for each of the reservation requests. The winning bid may be determined based on the bid amount included in the corresponding merchant bid, and may be further based on the additional bidding information depending on criteria submitted by the individual 104 in the travel itinerary request. For instance, in the above example, the individual 104 may weigh nonstop flights as more important than saving money, and may indicate a willingness to pay up to $100 more for nonstop flights than flights that include layovers. In step 322, the processing server 102 may be configured to initiate payment transactions for each of the reservation requests, for booking of the desired travel itinerary through the winning merchants 108, with payment to be supplied by the individual 104.

In step 324, the transmitting device 222 of the processing server 102 may electronically transmit booking notifications to the individual 104 (e.g., via the computing device 106) and each of the winning merchants 108, as well as a notification to the blockchain to post new transaction values to clear out each of the unique identifiers to indicate the corresponding reservation requests as being fulfilled. In step 326, the individual 104 may receive (e.g., via the computing device 106) a booking notification, where the booking notification includes the bidding information for each of the winning bids, thus completing their travel itinerary, and reservation information or information used to book their travel itinerary, as applicable. In step 328, each of the winning merchants 108 may receive a booking notification that indicates data associated with their winning bid and the corresponding reservation request, such as information for contacting the individual 104 for payment, a reservation confirmation for a paid reservation, or other data, as applicable. In some embodiments, the processing server 102 may also electronically transmit notifications to merchants 108 that submitted merchant bids that did not win, such as to notify them of their unsuccessful bid. In some instances, such notifications may also include information associated with the winning bid, such as the bid amount or additional bidding information.

Exemplary Method for Processing Travel Bids Via Blockchain

Figure 4:
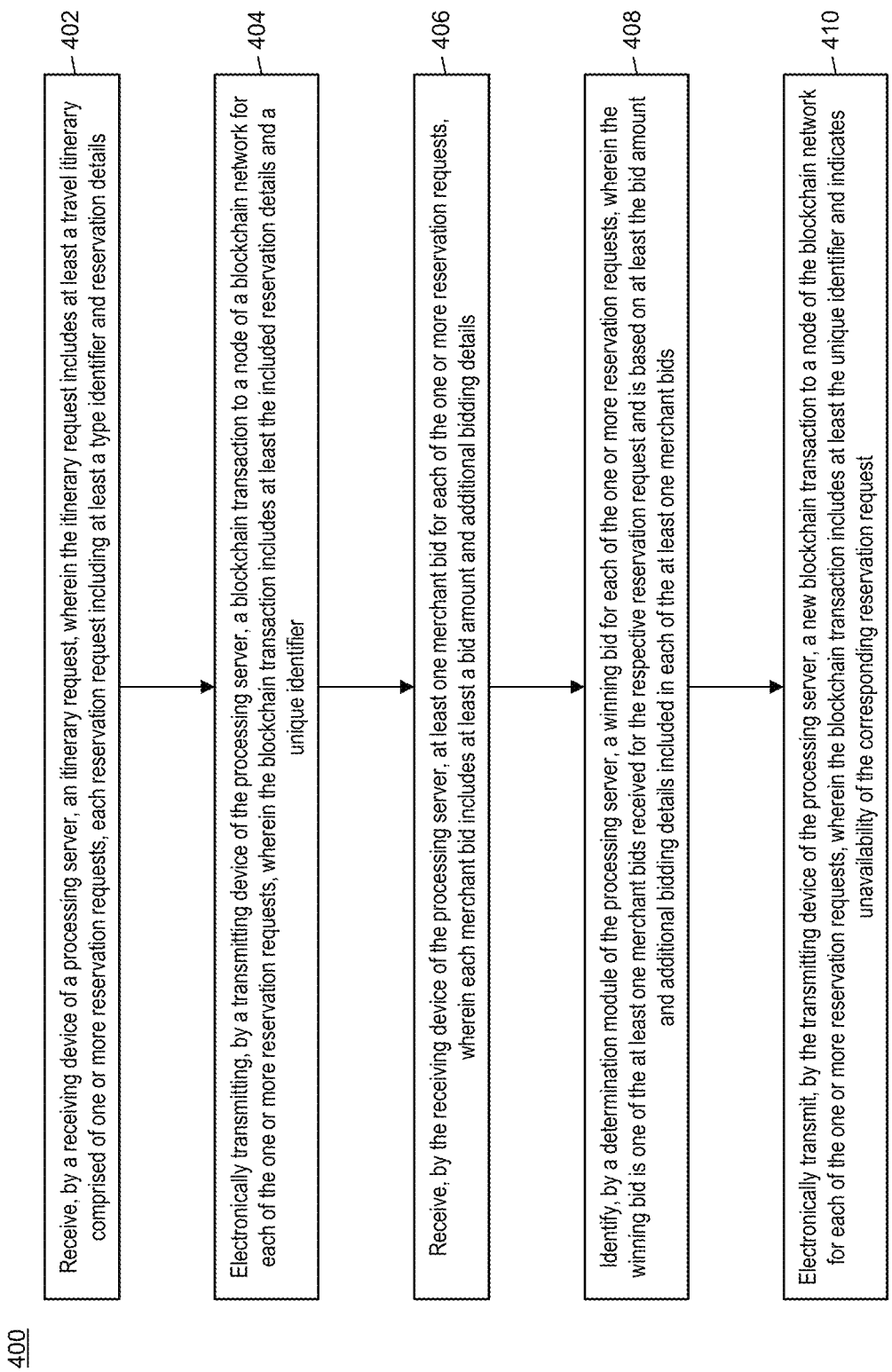
FIG. 4 is a flow chart illustrating an exemplary method for processing travel bids via blockchain in accordance with exemplary embodiments.

FIG. 4 illustrates a method 400 for the processing of travel bids for a desired travel itinerary using data posted to a blockchain for accessibility thereof.

In step 402, an itinerary request may be received by a receiving device (e.g., the receiving device 202) of a processing server (e.g., the processing server 102), wherein the itinerary request includes at least a travel itinerary comprised of one or more reservation requests, each reservation request including at least a type identifier and reservation details. In step 404, a blockchain transaction may be transmitted by a transmitting device (e.g., the transmitting device 222) of the processing server to a node of a blockchain network (e.g., the blockchain network 110) for each of the one or more reservation requests, wherein the blockchain transaction includes at least the included reservation details and a unique identifier.

In step 406, at least one merchant bid may be received for each of the one or more reservation requests by the receiving device of the processing server, wherein each merchant bid includes at least a bid amount and additional bidding details. In step 408, a winning bid may be identified by a determination module (e.g., the determination module 218) of the processing server for each of the one or more reservation requests, wherein the winning bid is one of the at least one merchant bids received for the respective reservation request and is based on at least the bid amount and additional bidding details included in each of the at least one merchant bids. In step 410, a new blockchain transaction may be electronically transmitted to the node of the blockchain network by the transmitting device of the processing server for each of the one or more reservation requests, wherein the blockchain transaction includes at least the unique identifier and indicates unavailability of the corresponding reservation request.

In one embodiment, the method 400 may further include electronically transmitting, by the transmitting device of the processing server, a plurality of bid requests for each of the one or more reservation requests, wherein each bid request includes at least the unique identifier included in the associated blockchain transaction. In a further embodiment, the plurality of bid requests electronically transmitted for each of the one or more reservation requests may be transmitted to a group of merchants (e.g., merchants 108) associated with the type identifier included in the respective reservation request.

In some embodiments, the new blockchain transaction may further include at least one of: the bid amount and additional bidding details included in the identified winning bid for the respective reservation request. In a further embodiment, the additional bidding details may include at least a merchant name. In another further embodiment, the additional bidding details may include a blockchain address associated with a merchant, and the new blockchain transaction may include payment of the bid amount included in the identified winning bid for the respective reservation request to the blockchain address included in the corresponding identified winning bid.

In one embodiment, the method 400 may also include electronically transmitting, by the transmitting device of the processing server, a notification for each of the identified winning bids to an entity associated with the corresponding merchant bid, wherein the notification includes an indication of identification of the corresponding merchant bid as the winning bid. In some embodiments, the itinerary request may further include one or more selection criteria, and the winning bid for each of the one or more reservation requests may be further based on a correspondence between the one or more selection criteria and the bid amount and additional bidding details included in each of the corresponding at least one merchant bids.

Computer System Architecture

Figure 5:
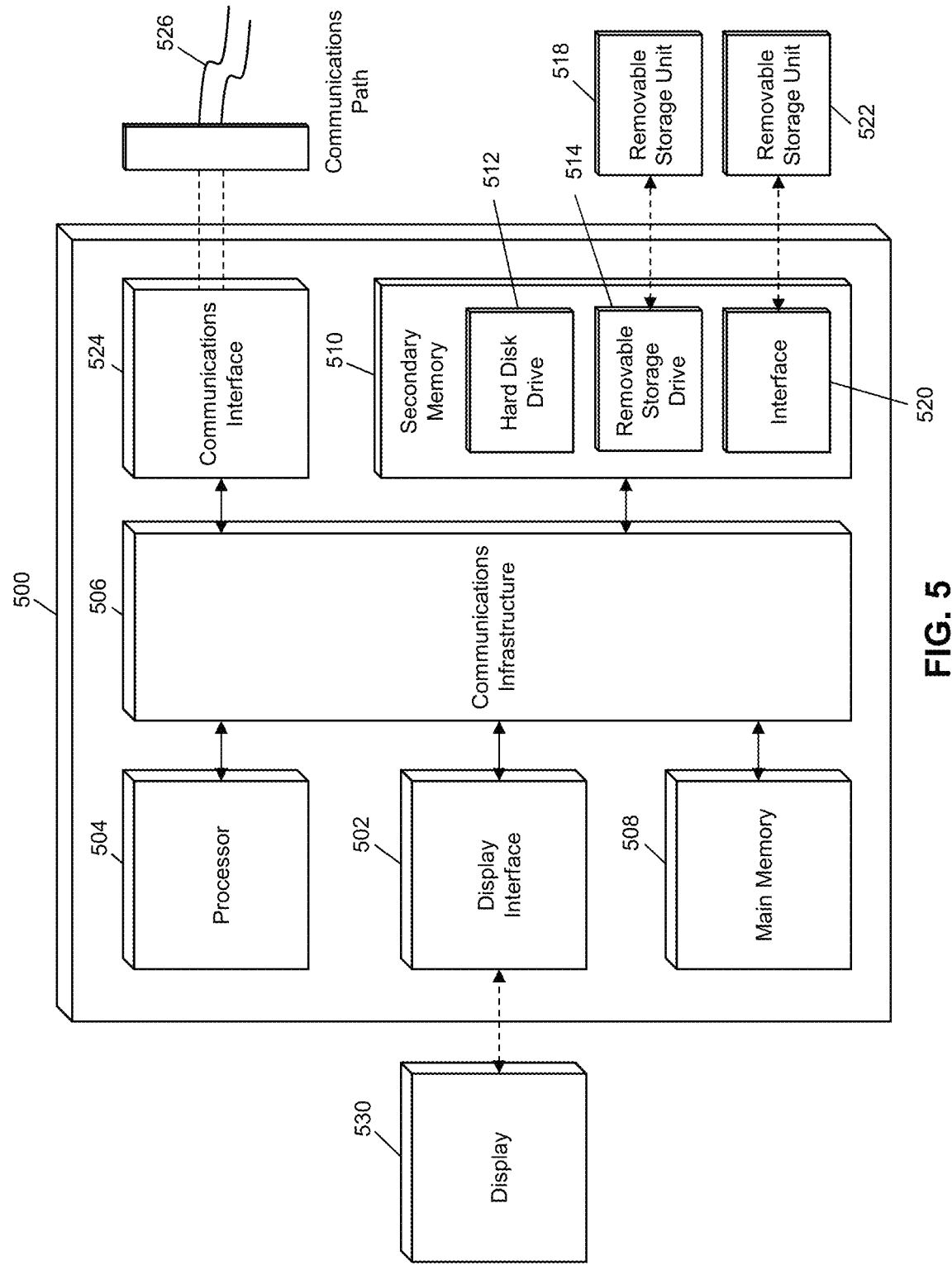
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for processing travel bids via blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for processing travel bids via blockchain, comprising:
    receiving, by a receiving device of a processing server, an itinerary request, wherein the itinerary request includes at least a travel itinerary comprised of one or more reservation requests, each reservation request including at least a type identifier and reservation details;
    electronically transmitting, by a transmitting device of the processing server, one or more blockchain transactions to a node of a blockchain network, each of the one or more blockchain transactions corresponding to one of the one or more reservation requests, wherein each of the one or more blockchain transactions includes at least the reservation details included in the corresponding reservation request and a unique identifier for the corresponding reservation request;
    receiving, by the receiving device of the processing server, at least one merchant bid for each of the one or more reservation requests, wherein each merchant bid includes at least a bid amount and additional bidding details;
    identifying, by a determination module of the processing server, a winning bid for each of the one or more reservation requests, wherein the winning bid is one of the at least one merchant bids received for the respective reservation request and is based on (i) at least the bid amount and additional bidding details included in each of the at least one merchant bids, and (ii) predefined criteria and/or criteria included in the respective reservation request; and
    electronically transmitting, by the transmitting device of the processing server, one or more new blockchain to a node of the blockchain network, each of the one or more new blockchain transactions corresponding to one of the one or more reservation requests, wherein the one or more new blockchain transactions include at least the unique identifier for the corresponding reservation request and indicates that the corresponding reservation request has been filled, wherein each of the one or more new blockchain transactions indicates to the blockchain network that a corresponding previous transaction for a respective reservation request is no longer a valid transaction for bidding.

2. The method of claim 1, further comprising:
    electronically transmitting, by the transmitting device of the processing server, a plurality of bid requests for each of the one or more reservation requests, wherein each bid request includes at least the unique identifier included in the associated blockchain transaction.

3. The method of claim 2, wherein the plurality of bid requests electronically transmitted for each of the one or more reservation requests are transmitted to a group of merchants associated with the type identifier included in the respective reservation request.

4. The method of claim 1, wherein the one or more new blockchain transactions further includes at least one of: the bid amount and additional bidding details included in the identified winning bid for the respective reservation request.

5. The method of claim 4, wherein the additional bidding details includes at least a merchant name.

6. The method of claim 4, wherein
    the additional bidding details includes a blockchain address associated with a merchant; and
    the one or more new blockchain transactions includes payment of the bid amount included in the identified winning bid for the respective reservation request to the blockchain address included in the corresponding identified winning bid.

7. The method of claim 1, further comprising:
    electronically transmitting, by the transmitting device of the processing server, a notification for each of the identified winning bids to an entity associated with the corresponding merchant bid, wherein the notification includes an indication of identification of the corresponding merchant bid as the winning bid.

8. The method of claim 1, wherein
the itinerary request further includes one or more selection criteria, and
the winning bid for each of the one or more reservation requests is further based on a correspondence between the one or more selection criteria and the bid amount and additional bidding details included in each of the corresponding at least one merchant bids.

9. A system for processing travel bids via blockchain, comprising:
a determination module of a processing server;
a receiving device of the processing server configured to receive an itinerary request, wherein the itinerary request includes at least a travel itinerary comprised of one or more reservation requests, each reservation request including at least a type identifier and reservation details; and
a transmitting device of the processing server configured to electronically transmit one or more blockchain transactions to a node of a blockchain network, each of the one or more blockchain transactions corresponding to one of the one or more reservation requests, wherein each of the one or more blockchain transactions includes at least the reservation details included in the corresponding reservation request and a unique identifier for the corresponding reservation request, wherein
the receiving device of the processing server is further configured to receive at least one merchant bid for each of the one or more reservation requests, wherein each merchant bid includes at least a bid amount and additional bidding details,
the determination module of the processing server is configured to identify a winning bid for each of the one or more reservation requests, wherein the winning bid is one of the at least one merchant bids received for the respective reservation request and is based on at least (i) the bid amount and additional bidding details included in each of the at least one merchant bids, and (ii) predefined criteria and/or criteria included in the respective reservation request, and
the transmitting device of the processing server is further configured to electronically transmit one or more new blockchain transactions to a node of the blockchain network, each of the one or more new blockchain transactions corresponding to one of the one or more reservation requests, wherein the one or more new blockchain transactions include at least the unique identifier for the corresponding reservation request and indicates that the corresponding reservation request has been filled, wherein each of the one or more new blockchain transactions indicates to the blockchain network that a corresponding previous transaction for a respective reservation request is no longer a valid transaction for bidding.

10. The system of claim 9, wherein the transmitting device of the processing server is further configured to electronically transmit a plurality of bid requests for each of the one or more reservation requests, wherein each bid request includes at least the unique identifier included in the associated blockchain transaction.

11. The system of claim 10, wherein the plurality of bid requests electronically transmitted for each of the one or more reservation requests are transmitted to a group of merchants associated with the type identifier included in the respective reservation request.

12. The system of claim 9, wherein the one or more new blockchain transactions further includes at least one of: the bid amount and additional bidding details included in the identified winning bid for the respective reservation request.

13. The system of claim 12, wherein the additional bidding details includes at least a merchant name.

14. The system of claim 12, wherein
the additional bidding details includes a blockchain address associated with a merchant; and
the one or more new blockchain transactions includes payment of the bid amount included in the identified winning bid for the respective reservation request to the blockchain address included in the corresponding identified winning bid.

15. The system of claim 9, wherein the transmitting device of the processing server is further configured to electronically transmit a notification for each of the identified winning bids to an entity associated with the corresponding merchant bid, wherein the notification includes an indication of identification of the corresponding merchant bid as the winning bid.

16. The system of claim 9, wherein
the itinerary request further includes one or more selection criteria, and
the winning bid for each of the one or more reservation requests is further based on a correspondence between the one or more selection criteria and the bid amount and additional bidding details included in each of the corresponding at least one merchant bids.

* * * * *